A. H. Bryant,
Egg Box,

N° 81,593.      Patented Sep. 1, 1868.

Witnesses.
Wm B Wiggins
James Moore

Inventor.
Abner H Bryant

UNITED STATES PATENT OFFICE.

ABNER H. BRYANT, OF WILMINGTON, DELAWARE.

IMPROVEMENT IN SAFETY-ATTACHMENTS FOR EGG-CARRIERS.

Specification forming part of Letters Patent No. 81,593, dated September 1, 1868.

*To all whom it may concern:*

Be it known that I, ABNER H. BRYANT, of the city of Wilmington, in the State of Delaware, have invented a new and useful Improvement upon the Suspension Egg-Carrier for which Letters Patent were issued to me, bearing date the seventeenth day of March, A. D. 1868, which I term a "Safety-Attachment," and is applied for the purpose of preventing the eggs from being jostled from the pouches in the event of the carrier being overturned or turned bottom upward; and I do hereby declare that the following is a full, clear, and exact description of the same, reference being had to the annexed drawings, making a part of this specification, in which—

Figure 1:
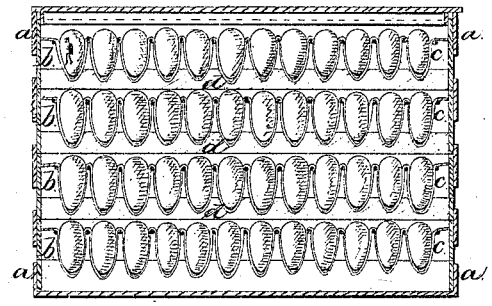
Figure 2:
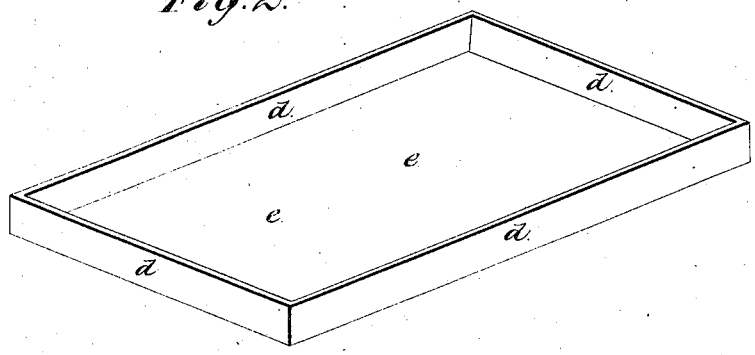

Figure 1 is a section of the egg-carrier, with the improvement attached; Fig. 2, a perspective view of the safety-attachment.

In these drawings, *a a a a* represents the outside frame-work of the suspension egg-carrier or crate; *b b b b*, the trays, with egg-pouches *c c c c*. *d d d* is the frame-work of the safety-attachment; *e e*, its cloth bottom.

This safety-attachment I construct of wood and cloth, as shown, the frame being of the same shape and dimensions as the trays, and is provided with a cloth bottom, which I tack or fasten to the frame, as shown by the drawings.

The operation of this safety-attachment is as follows: One of these frames, with its cloth bottom, being set in the carrier between the egg-trays, it prevents the eggs from being jostled from their pouches and broken, even should the carrier be overturned or thrown bottom upward, inasmuch as the space between the cloth bottom and the eggs in the upper and lower pouch-trays is barely sufficient to give them a slight play, and at the same time keeps each egg secure in its nest or pouch, no matter how rough the handling.

Having already been granted Letters Patent for the carrier itself, I do not, of course, make another claim for it with the present improvement, but confine my claim to the safety-attachment.

What I claim as my invention, and desire to secure by Letters Patent, is—

The frame, with its cloth bottom arranged and constructed as shown, as a safety-attachment for the suspension egg-carrier hereinbefore mentioned.

ABNER H. BRYANT.

Witnesses:
 JNO. WILSON,
 JOHN D. STANGER.